Figure 1:
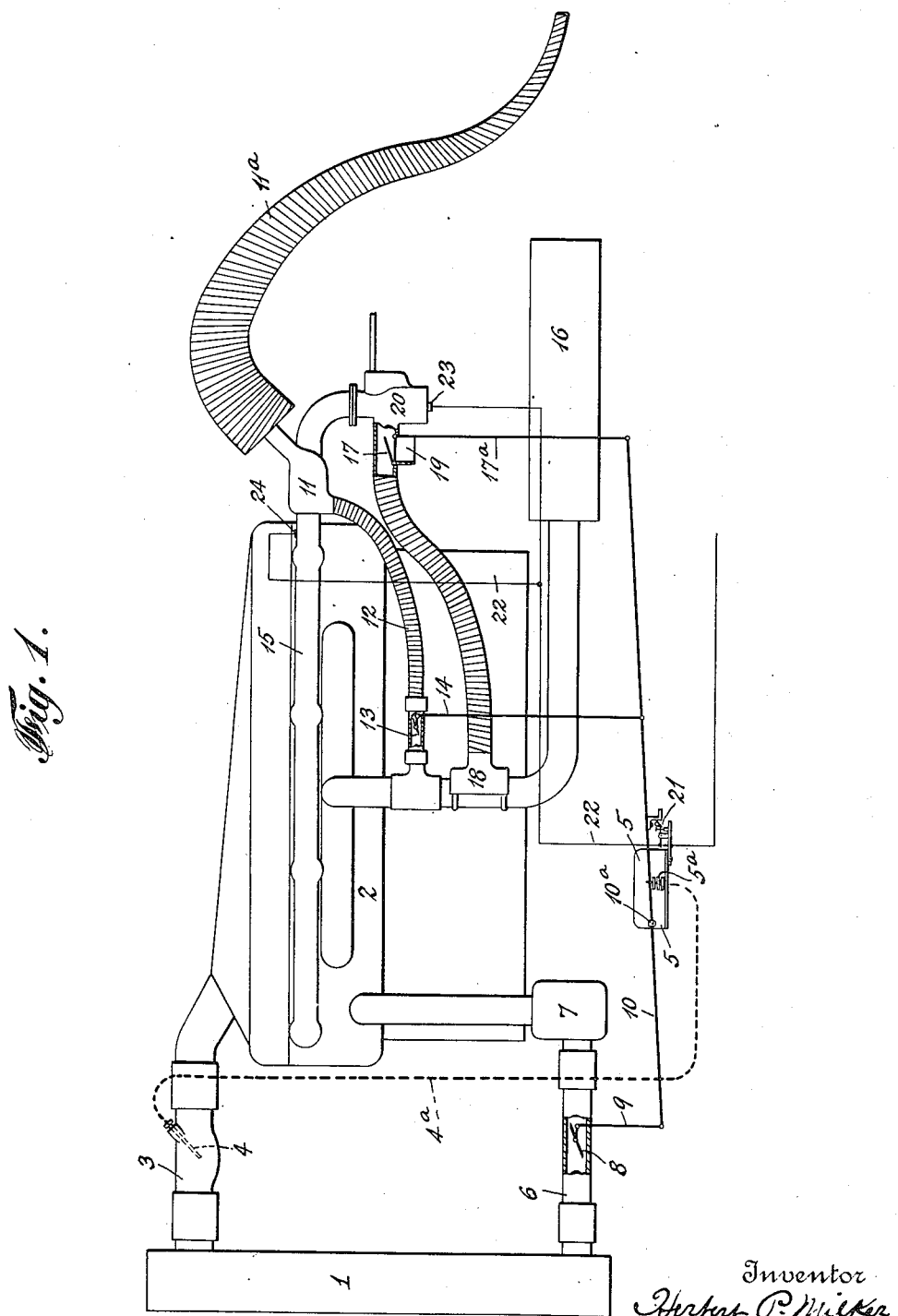

Dec. 11, 1923.

H. P. MILKER 1,477,277

THERMOSTATIC CONTROLLING MEANS FOR INTERNAL COMBUSTION ENGINES

Filed April 6, 1920 9 Sheets-Sheet 3

Inventor
Herbert P. Milker
By his Attorneys
Bresen Schrenk

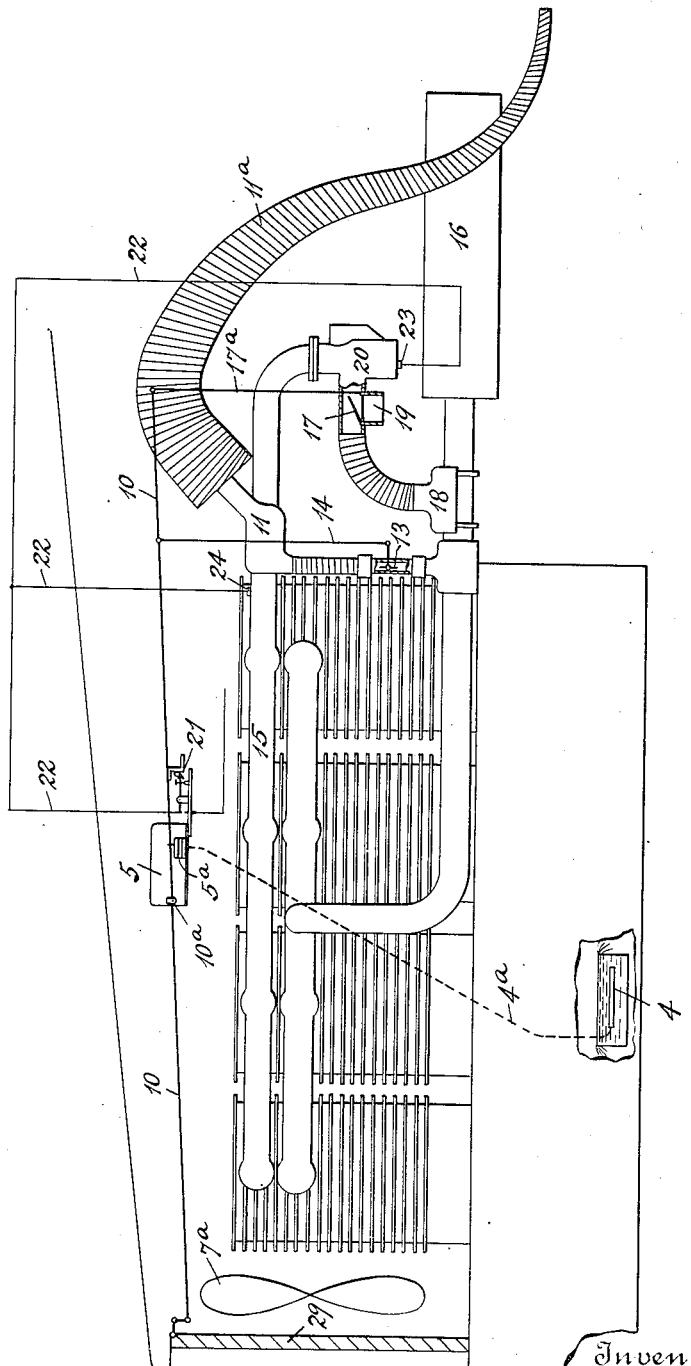

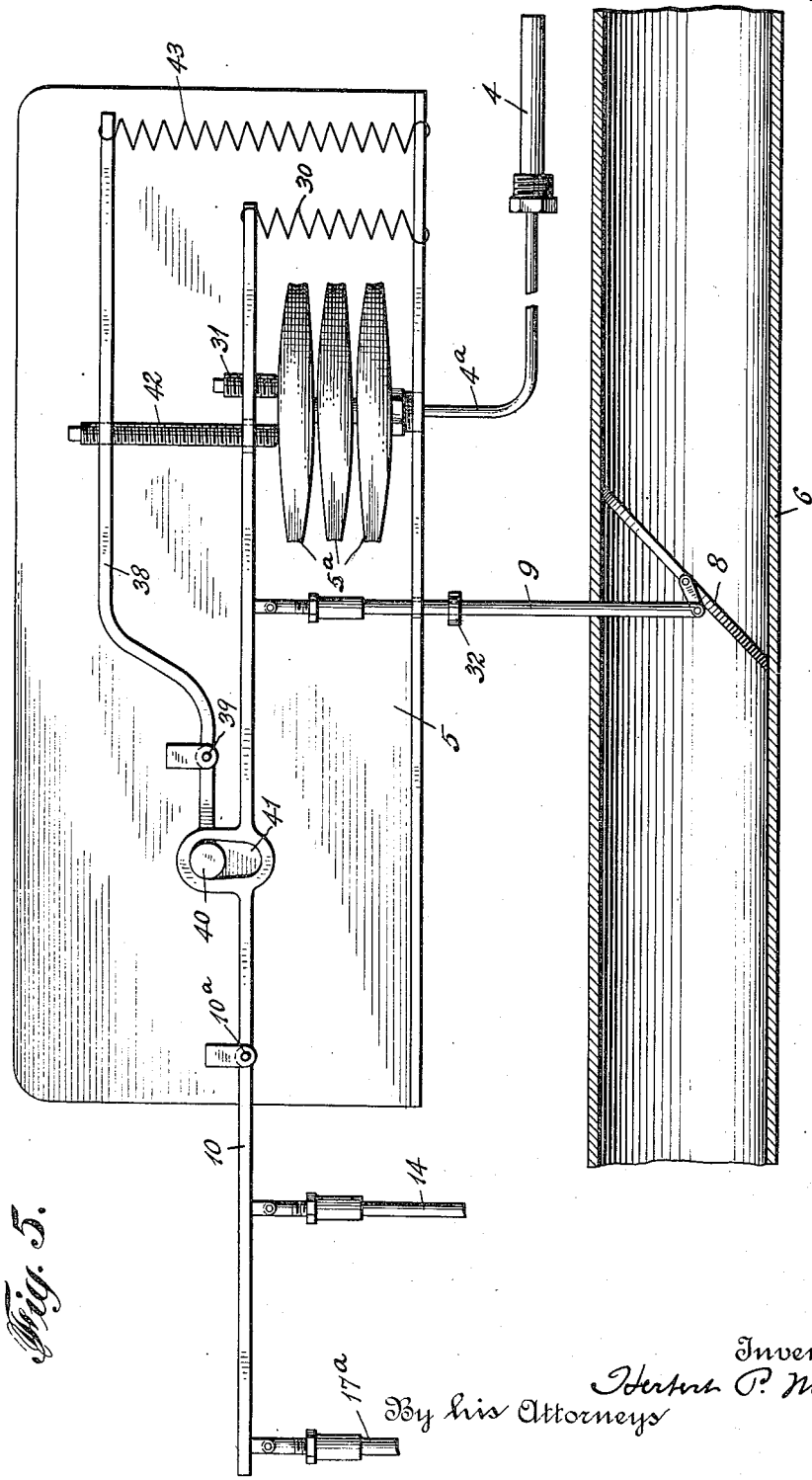

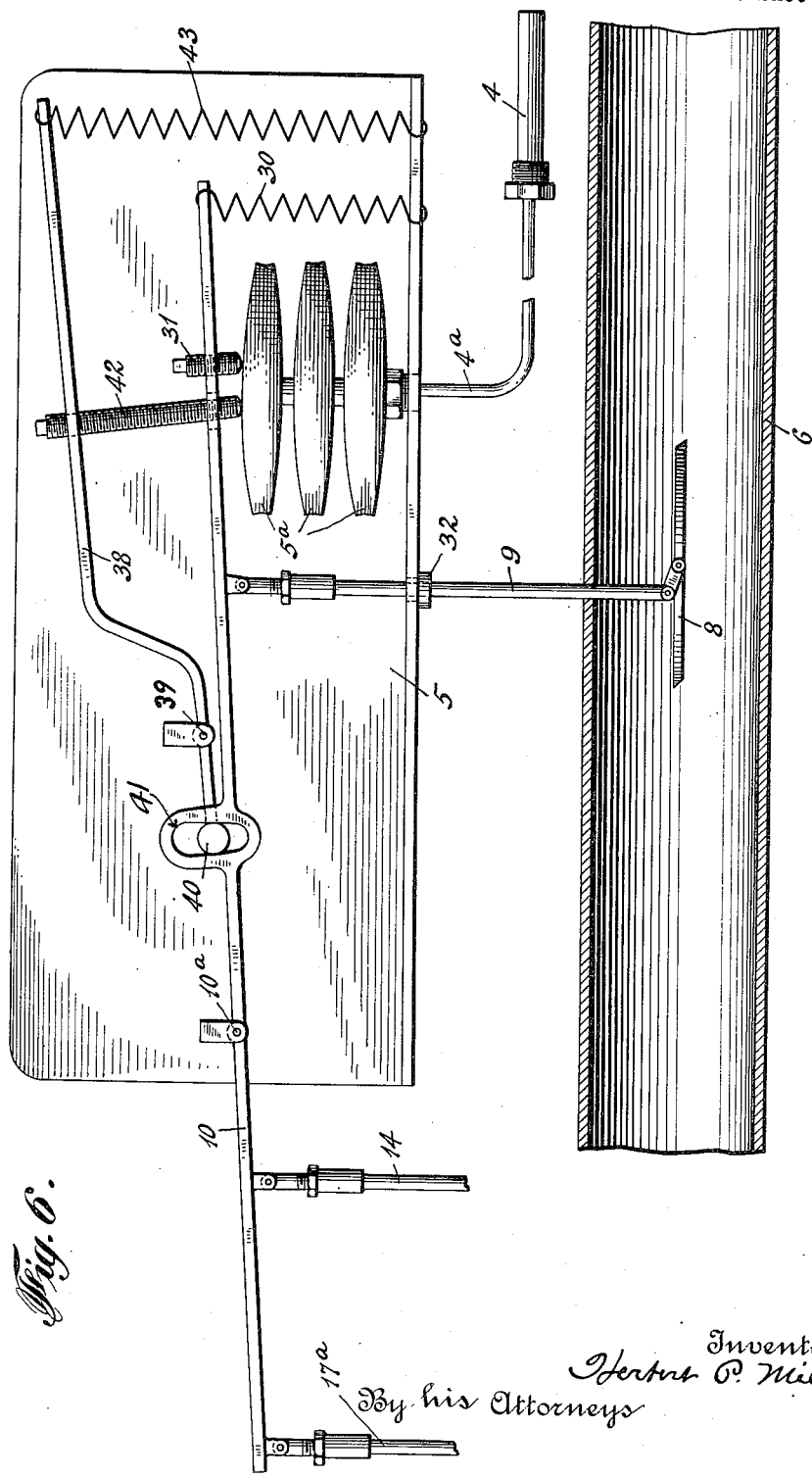

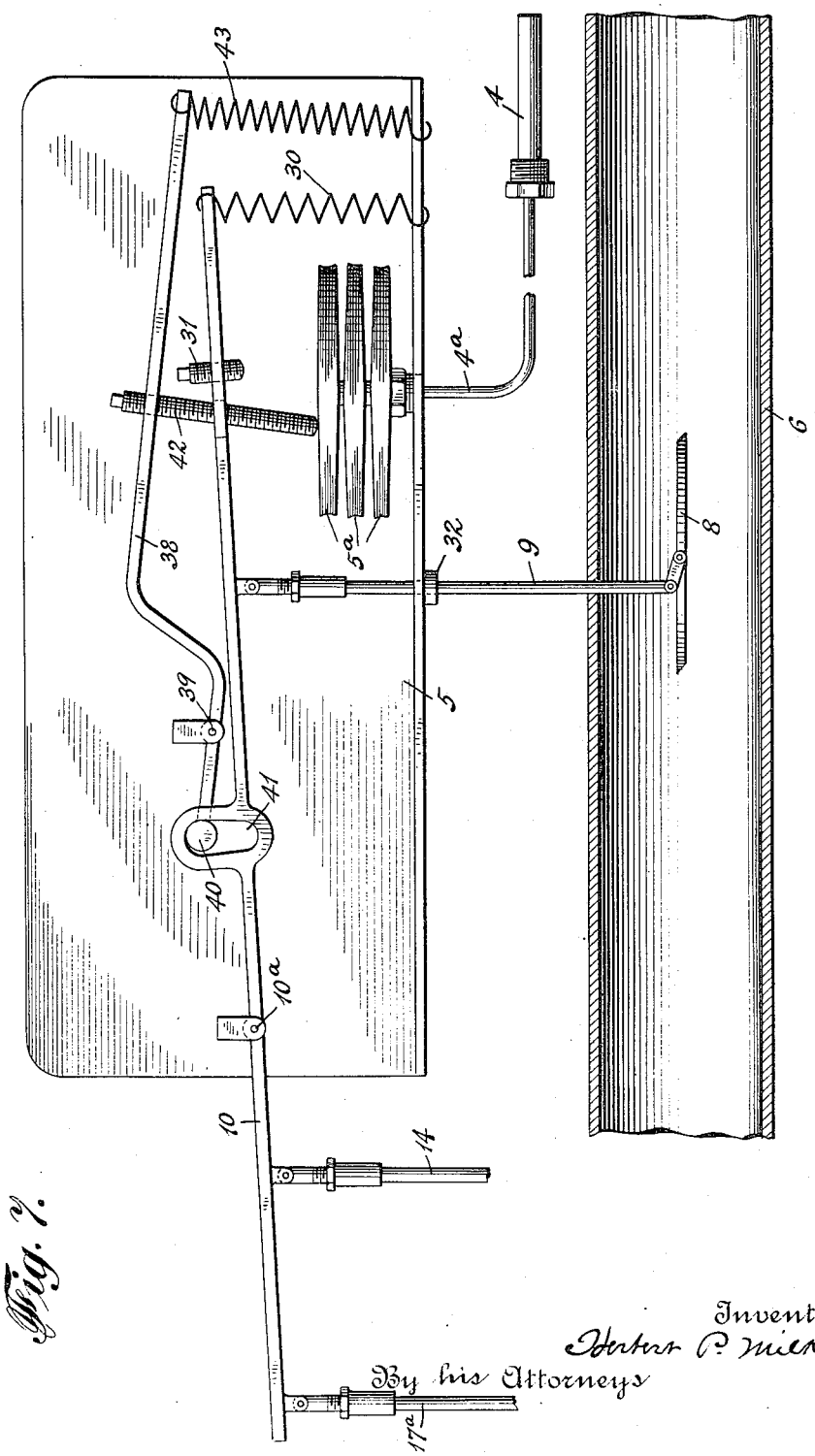

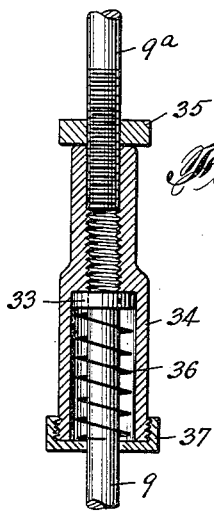
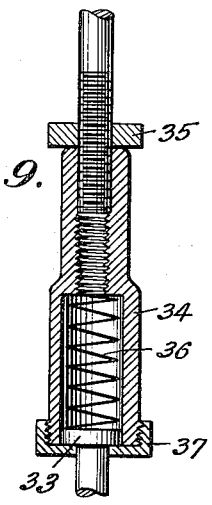
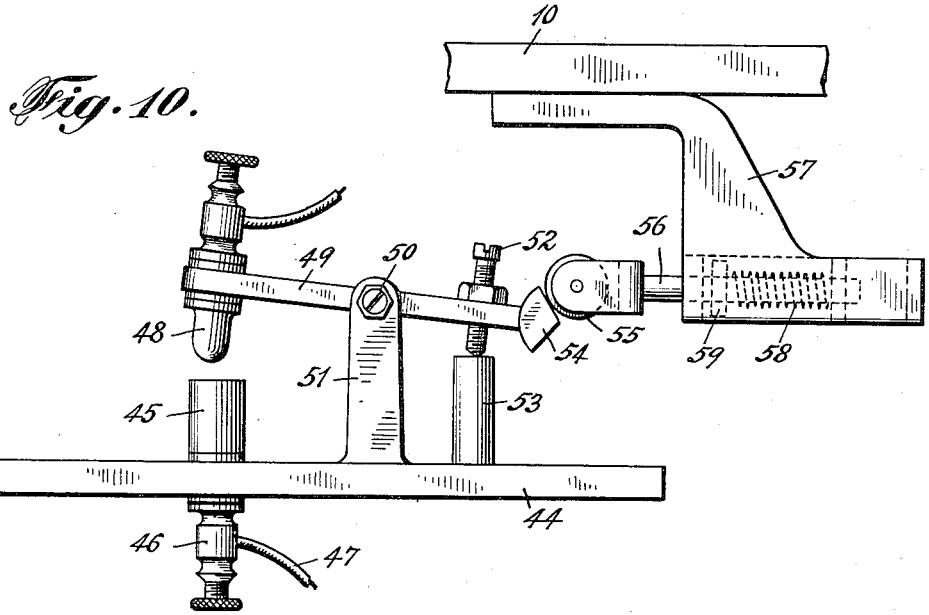

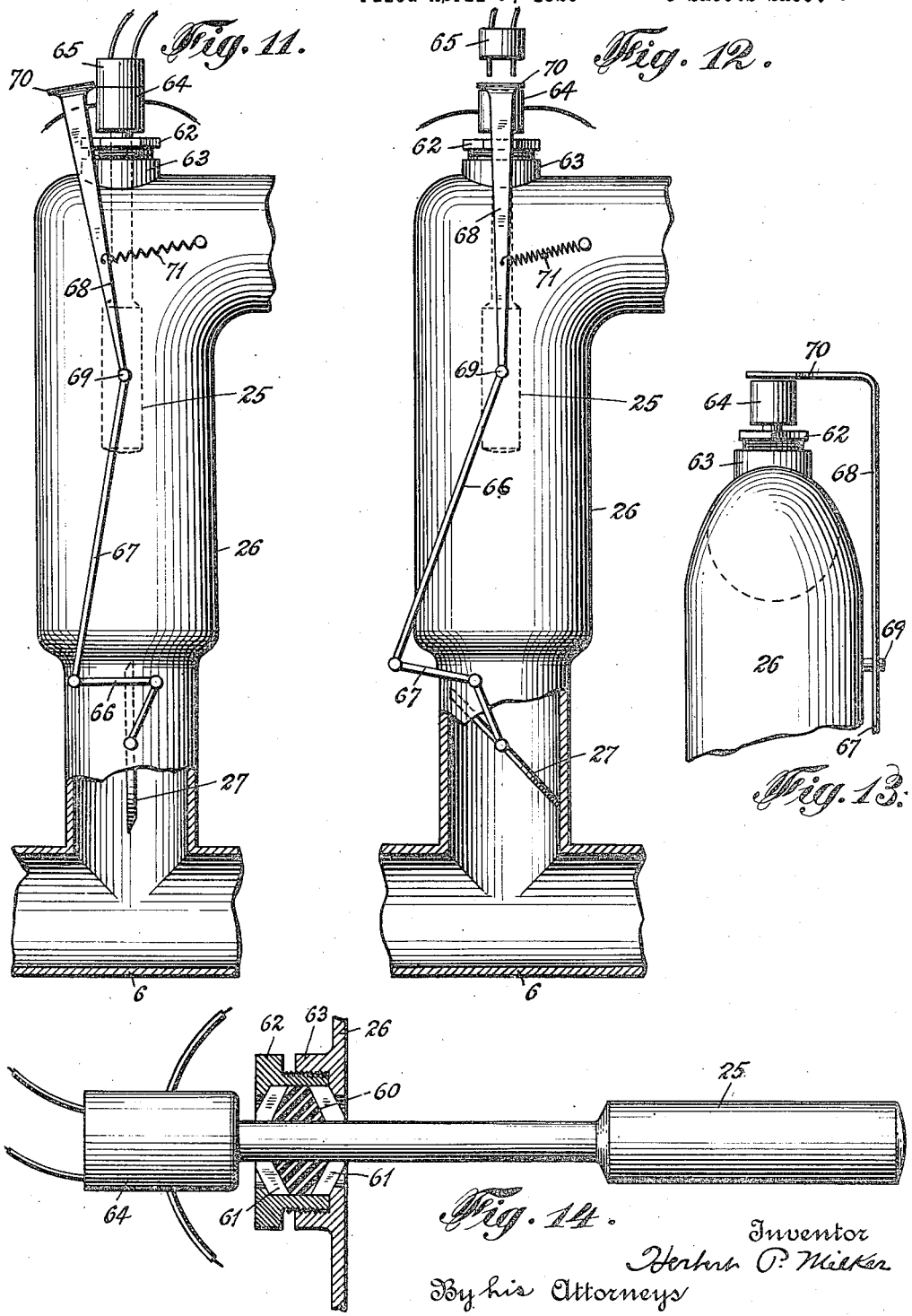

Patented Dec. 11, 1923.

1,477,277

UNITED STATES PATENT OFFICE.

HERBERT P. MILKER, OF BROOKLYN, NEW YORK, ASSIGNOR TO CHARLES J. TAGLIABUE MANUFACTURING CO., OF BROOKLYN, NEW YORK, A CORPORATION OF NEW YORK.

THERMOSTATIC CONTROLLING MEANS FOR INTERNAL-COMBUSTION ENGINES.

Application filed April 6, 1920. Serial No. 371,756.

*To all whom it may concern:*

Be it known that I, HERBERT P. MILKER, a citizen of the United States, and resident of the borough of Brooklyn, county of Kings, city and State of New York, have invented certain new and useful Improvements in Thermostatic Controlling Means for Internal-Combustion Engines, of which the following is a specification.

My invention relates to internal combustion engines, explosion engines or hydrocarbon motors, as they are variously called, both water cooled and air cooled and has to do more particularly with thermostatic controlling means for such engines. The particular object of this invention is the provision of simple and efficient means whereby heat, is supplied either or both regeneratively or from a source other than the combustion, and automatically regulated to secure practically complete vaporization of the liquid fuel under any of the variable conditions to which the engine may be subjected. My invention will be fully described hereinafter and the features of novelty will be pointed out in the appended claims.

In pointing out the utility of this invention I will confine myself to illustrations and descriptions involving the application of the invention to a multi-cylinder, gasoline, automobile engine, it being understood that the illustrated and described examples are not intended to define the limits of said invention and that the same is equally well adapted for use in connection with internal combustion engines or other types and for driving automotive implements, airplanes, boats or vessels, electric generation systems, etc. With this in mind reference is to be had to the accompanying drawings in which Figs. 1, 2, 3 and 4 are diagrammatic views illustrating several forms of my invention; Fig. 5 is an enlarged detail view illustrating an example of the controller which forms part of my invention; Figs. 6 and 7 are similar views showing the parts in different positions; Figs. 8 and 9 are detail sections illustrating safety devices which form part of the invention; Fig. 10 is a detail view of an electrical contact device included in the invention and Figs. 11, 12, 13 and 14 are views illustrating in detail elements forming part of the construction shown in Fig. 2.

In order to secure proper vaporization of the gasoline and an intimate mixture of same with the air, both the gasoline in the carburetor bowl and the air entering the carburetor must be at a certain minimum temperature to at least vaporize the more volatile portions of the liquid fuel and then enough additional heat must be supplied to an inlet manifold to prevent condensation of the evaporated portion of the gasoline and to vaporize those portions of the gasoline, carried in suspension, which have a higher end point and, furthermore, any excessive cooling of the cylinder walls must be avoided. If these necessities are not met faulty operation of the engine results.

By means of this invention it is possible to meet these necessities completely, and thereby at all times to enable a hydrocarbon motor to be operated at the greatest possible efficiency, from the starting of a cold motor to the other extreme of a heated up motor called upon to operate under variable loads and under various atmospheric temperature conditions and in spite of the high end point of present day gasoline. This is accomplished by providing for the automatic control of quick and complete evaporation of all the liquid fuel drawn into the inlet manifold but without overheating the mixture and, therefore, without the resultant lowering of the volumetric efficiency which would be caused by such overheating. While this latter deficiency does not result in any direct harm to the engine but only makes it impossible to secure the full power for which the engine was designed, the recondensation of any evaporated gasoline or the remaining in suspension in the air of the less volatile portions of the gasoline, in the form of minute globules of liquid (namely—a wet mixture) means that raw gasoline enters the cylinders of the engine, resulting in excessive carbonization, erratic firing with resultant strain on the mechanism and waste of the liquid fuel. Also, the raw gasoline works down past the piston rings, impairing the lubrication of the pistons, and entering the crank case or oiling system, dilutes the lubricant therein, causing impairment of the lubricant for the entire engine oiling system when, as is usually the case, the oil is recirculated continuously. Furthermore, a wet mixture causes fouling of the spark plugs. Lastly, distribution of a wet mixture, through the intake manifold and into the cylinders uniformly, is an impossibility because the mixture flows at a high velocity and the liquid gasoline (which in a wet mixture is present in the form of minute globules carried in suspension, as already stated,) will separate from the air stream, due to the greater inertia of said liquid gasoline. When, however, all the gasoline is vaporized (i. e., a dry mixture is secured) the vaporized gas behaves exactly like the air and nicely takes the turns of the manifold and the turns of the connections from the manifold to the inlet valves, along with the air. Unequal distribution, as referred to, not only causes erratic and unbalanced running of the engine but a wet mixture is also the cause of sluggish acceleration due to the fact that the air will move more quickly than the liquid gasoline particles under the impetus of a quickly opened throttle.

While a large number of gasoline engine builders are today giving particular emphasis to their engines being provided with a "hot spot" arrangement for securing complete evaporation of the liquid fuel, such hot spot does not function until the engine has been running for a short time. Furthermore, the hot spot does not get hot enough under low throttle conditions, because of the lower heat of the exhaust gas in comparison with the exhaust gas heat existent under open throttle conditions, the theory of a hot spot manifold being that the mixture is heated without decrease of volumetric efficiency by so designing such inlet manifold that a very hot spot (heated by the exhaust gas) is located at such point that the heavy particles of the fuel (the unvaporized particles of gasoline) will be thrown against said surface and vaporized, whereas the air and the lighter particles (very minute particles of liquid gasoline that will be readily vaporized in the hot combustion chamber of the engine cylinder) will be diverted from the hot spot. In using the term hot spot I do not intend to confine myself to the type of hot spot hereinbefore referred to but on the contrary by this term intend to define any arrangement whereby the heat from exhaust gases is applied to the inlet manifold. The present invention not only provides an efficient means for controlling the hot spot automatically to best meet the variable conditions under which the engine operates but also provides for controlling, automatically and either synchronously or progressively, other factors which influence the complete vaporization of the gasoline without decrease in the volumetric efficiency of the engine.

These other factors are the temperature of the water, air or other fluid which is circulated past the cylinder wall and the temperature of the air which is drawn into the carburetor. If in the case of an automobile, thermometers were applied to show these temperatures and manual control were provided for varying said temperatures at will, the operator usually would have to take into account a certain average of all the temperatures to secure the utmost efficiency. Consequently, I prefer to use an automatic controller so arranged that while primarily it is influenced by the temperature at the bulb location, it is influenced, also, to a certain extent by the other factors which are in relationship to the temperature of the air in which the motor operates and, furthermore, said automatic controller is arranged to respond gradually and continuously to temperature changes, instead of intermittently. Also, I prefer to use an automatic controller so arranged that a failure, that is a leakage or breakage of either the thermostatic bulb, the connecting tubing or the expansible and contractible pressure-unit, commonly termed a bellows, will automatically result in the controlling valve remaining in a position of safety.

One form of my invention and a typical application thereof, is illustrated in Fig. 1, a schematic drawing, in which the controller is shown as applied to a water cooled automobile engine for regulating the temperature of the cooling water within the engine jackets and for progressively supplying auxiliary heat to the inlet manifold if the engine is cold when started and then checking auxiliary source of heat when motor has turned over sufficiently long enough to generate enough exhaust heat to fulfill the requirements to a greater or lesser extent, synchronously with the regulation of the cooling water as the engine heats up.

As shown in Fig. 1 the radiator of a water cooled, automobile engine is indicated at 1 and the water outlet leading from the jackets of the engine 2 to said radiator is shown by pipe 3 in which is located the thermostatic bulb 4 connected by means of the customary capillary tubing 4ª with the bellows 5ª of the controller 5. The latter in one form will be described in detail later on in the description. The return of the cooling water through the radiator is by means of a pipe 6 connected with the inlet side of a circulating pump 7; a circulation controlling valve, which is illustrated for convenience in the form of a butterfly valve 8 is located in the pipe 6 between the radiator 1 and the pump 7. It will be understood that the latter is not necessarily a part of the equipment and that it may be replaced by a thermo-siphon system or any other arrangement suitable for the intended purposes. The valve 8 is connected by means of a connecting rod or link 9 with a lever 10 fulcrumed at 10ª and operatively controlled by the bellows 5ª of the controller 5.

As the temperature of the circulating water varies at the bulb 4, this being its hottest or approximately its hottest part, the controller 5 through the action of the bellows 5a and the lever 10 and link 9 causes the valve 8 to function in accordance. That is to say the valve 8 will shut off the circulation entirely if the motor is cold enough or it will maintain said circulation open to a variable extent in the case of a heated up motor; if the temperature at 4 is the maximum for which the controller is set the butterfly valve 8 or its equivalent will be fully open. While, as already stated, the action of the controller is primarily influenced by the bulb temperature, it is desirable to have the controller also partly influenced by the temperature of the air under the engine hood, especially when said controller performs more than one function as will be hereinafter more fully pointed out, as thus a better average of the conditions which influence the motor and mixture temperatures is secured. Therefore whenever the temperature at 4 is spoken of as influencing the action of the controller it is to be understood that there may be also a slighter, secondary influence effective therein. In order that such secondary influence may properly affect the controller it is preferable to fill the bulb 4, capillary tubing 4a and bellows 5a to their full capacity with liquid; this also insures a quick response in the controller from cold to hot and renders the same more powerful in its action than when vapor pressure (generated from a bulb partly filled with volatile liquid) is used.

The controller in Fig. 1 is shown also as governing the temperature of the hot spot 11 which may be of any usual type and in the illustrated form is connected with the exhaust by means of a tube 12 in the customary manner. As illustrated schematically in Fig. 1 a valve 13, which may be of the butterfly type as shown or of any other suitable type, is located in the tube 12 and is connected by a connecting rod or link 14 with the lever 10. With this arrangement as the controller 5 is actuated as previously described to rock the lever 10, the valve 13 will be adjusted to permit more or less of the exhaust gases to flow through the hot spot chamber surrounding the inlet manifold 15, the adjustment of said valve 13 depending upon the temperature at the bulb 4 and being always in relationship to the hot spot requirements under the condition existing at any particular time.

In order that when valve 13 is partly or entirely open the exhaust gas will meet with less resistance by flowing through the valve 13 instead of taking its natural course through the exhaust pipe leading to the muffler 16, it is desirable (for this type of hot spot) to use a "non-baffled" exhaust outlet, such, for instance, as indicated at 11a which is simply a tapered, corrugated, flexible tube of large diameter at the hot spot chamber outlet and of gradually decreasing diameter toward its other end which is open to the atmosphere. Because of the corrugations afforded by the flexible tubing and the consequent large surface thus exposed, the exhaust gases are cooled naturally during their passage and without meeting any resistance caused by baffle plates, small openings, etc., thus affording less resistance to whatever exhaust gases are allowed to flow past valve 13 through hot spot 11 and out through the open end that would be the case if they took their natural course, as stated, through muffler 16.

The controller in Fig. 1 is furthermore shown as connected to a valve 17 which may be of the butterfly type or of any other suitable construction and which allows either hot air to be drawn from a "stove" 18 attached to the main exhaust line or air of lower temperature from underneath the engine hood and through inlet 19 so that the air reaching the carburetor 20 may either be only air heated by the "stove" and thus of a relatively high temperature or else only air supplied through inlet 19 and therefore of a relatively low temperature or else air partly obtained from each source and thus of an intermediate temperature, depending on the temperature of the engine and which, again, is reflected by the temperature at 4. The valve 17 is connected with the lever 10 by means of a connecting rod or link 17a.

When the engine is cold and standing idle the temperature at 4 is so low that the controller has caused the butterfly valve 8 in the return line 6 to be entirely closed and at the same time has caused butterfly valve 13 in the hot spotline to be wide open and at the same time has also caused butterfly valve 17 in the carburetor air inlet to be in a position which will admit no air through inlet 19. In addition the controller is shown as having also caused the closing of a switch shown at 21, so that when the engine is to be started and the ignition switch is closed and an electric current is thus allowed to flow through circuit 22, the current also can flow to heating plug 23 in the carburetor bowl as well as to heating plug 24 in the inlet manifold, thereby heating both the gasoline in the carburetor bowl and the vapor reaching the inlet manifold. This arrangement enables quick evaporation of at least the more volatile portions of the gasoline to be secured and prevents condensation of said vapor by means of the heat afforded at 24. The drain on the storage battery which supplies this current is much less for these heating requirements than when the starting motor is called upon to use a much greater amount of current for the longer period required to start the motor when it is cold and such electric heating is not used. The controller breaks this heating circuit, at 21, as soon as the engine has generated enough heat, as reflected at 4, to supply heat through hot spot chamber 11 instead. The temperature at 4 which will, through the controller, cause switch 21 to open or close depends on the setting point of the controller, in the first place, and, secondly on the independent adjustment provided on the connecting rod between controller-lever and switch which will be hereinafter more fully set forth. An independent means of adjustment may also be used in connection with valves 13 and 17; that is, while same synchronize with the valve 8, the levers connecting them with controller 5 may be adjusted so that the full opening or full closing of 13 and 17 may be in advance or behind that of valve 8 if desired, or in other words they may be made to open or close more quickly, one than the other, if so desired. This adjusting means will also be described in detail hereinafter.

After the motor has been started and is getting hotter and hotter, the butterfly valve 8 opens more and more thus allowing more of the water from radiator 1 to flow through the jackets of the engine block 2 and at the same time the butterfly valve 13 will close more and more, thus permitting progressively less heat to reach the hot spot 11; at the same time the butterfly valve 17 is allowing more and more air to be drawn through inlet 19, thereby causing the temperature of the air reaching the carburetor 20 to be diminished as the motor heats up. When the motor has heated up enough to cause a temperature of say 180° F., at the bulb 4, the valve 8 will be wide open, the valve 17 will allow all of the air for the carburetor to enter through 19 and none to come from the stove 18 while the valve 13 will be in such a position that just enough exhaust gas will flow past it and to the hot spot 11 to meet the requirements. If for any reason the motor temperature drops, the valve 8 will start to close, the valve 17 will start to allow air from stove 18 to flow to the carburetor 20 and valve 13 will allow more exhaust gas to flow to hot spot 11. The setting point of the controller may be changed, at will, to cause the valve 8 to be wide open at either a lower or higher temperature than that given above as an example, and, as stated, each valve, etc., may be independently adjusted also as may be desired.

While all of the control functions covered by foregoing description are deemed desirable for a smoothly firing motor, from the start of a cold motor to a heated-up motor working under various conditions, with the greatest economy of fuel, with the greatest economy of power output and with the least wear and tear on the engine, they are not all necessarily essential parts of a complete organization but any of the functions mentioned in addition to the control of the water circulation can be dispensed with if desired and none or any of the remainder still used. For instance, the controller 5 with bulb located at 4 and butterfly valve at 8 and with contoller constructed to not only be influenced by temperature at 4 but to a certain extent by the air temperature existing underneath the hood of the engine and with the bulb applied at 4 without any heat insulation feature, itself affords a very desirable unit. A further step, however, is the combining of hot spot 11 and its adjuncts together with butterfly valve 13. Another step in advance is the further addition of the butterfly valve 17 applied to the carburetor air inlet. A still further step is the adding of the electric heating feature for quickly getting a cold motor started into uniform running by either or both of the heating units 23 and 24. It will be further understood that each of the arrangements described may be used alone as units or in combination with any of the others to form different combination of units.

While that portion of Fig. 1 which shows the hot spot arrangement covers a typical layout particularly adapted to an engine which when originally built was not supplied with a hot spot arrangement, it is to be understood that any hot spot arrangement either built into the engine or applied later can be used, without departing from the spirit of the indicated portion of this invention. No novelty is claimed in the use of a hot spot as such, nor in the use, as such, of the stove for supplying heat to the carburetor air intake, nor for the use, as such, of electric resistance heaters for supplying heat to the gasoline in the carburetor bowl or the mixture in the inlet manifold, but novelty is claimed only for the automatic control of these various units.

Figure 2:
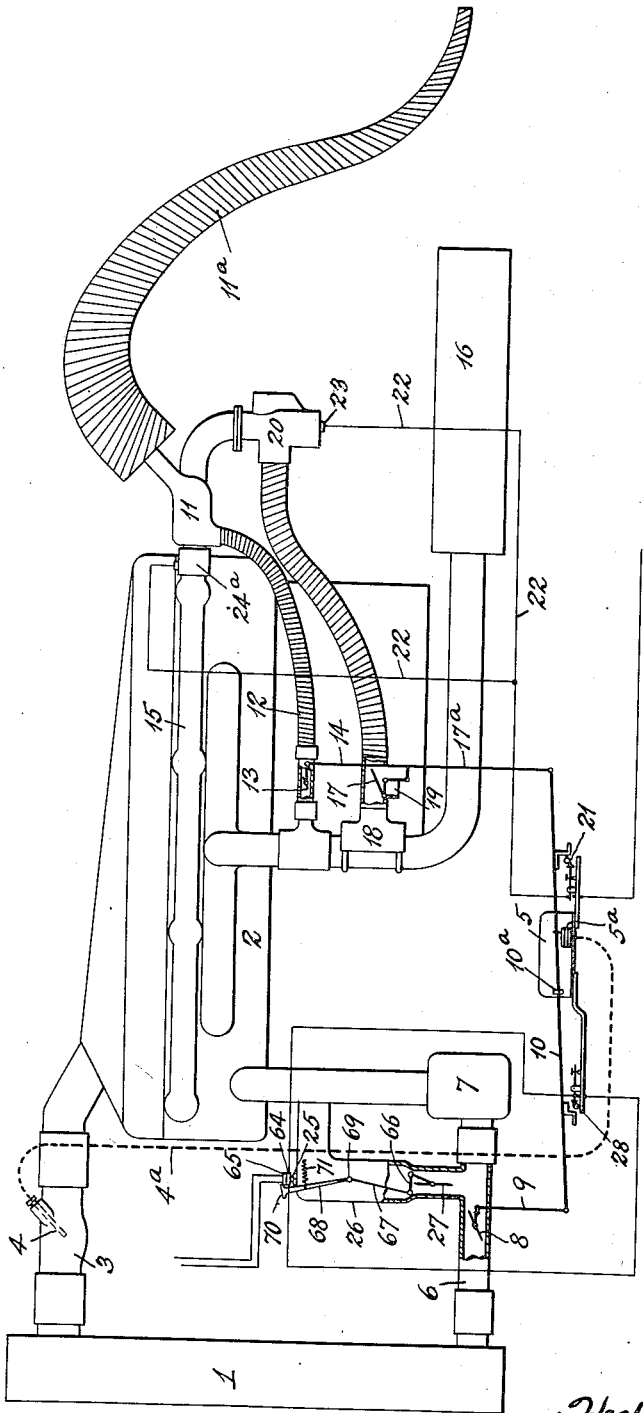

The arrangement shown in Fig. 2 may be the same as that of Fig. 1 and differs therefrom in that the inlet manifold 15 is, in this case, shown as being provided at 24$^a$ with an electric resistance heater in the form of an external jacket instead of an internal unit. The arrangement of Fig. 2 includes an addition, however, in the form of an electric heating attachment for keeping an automobile (for instance) warm in a cold garage over night when a properly heated garage is not available, and which attachment may use the current from the house lighting circuit or any other which is available. Automatically controlling the heating means in the manner illustrated and to be described, it is possible to keep a water cooled automobile (for instance) standing in a cold garage without the necessity of using a non-freezing solution in the radiator or of emptying the radiator and without danger of the water either freezing or boiling away, and withal economically, for, in spite of the fact that electric form of heat is usually expensive, the radiator front and the entire hood of the automobile may be blanketed while said heater is in operation and the operation of the automatically controlled electric switch so adjusted that the water will be slowly circulated through the system at a relatively low temperature. Little electric energy is thus required and even this little is generally used intermittently, to keep the water from freezing. On the other hand, the water may be kept hot enough to serve to keep the entire garage warm also if desired. The arrangement includes also the additional novel feature that (in the case of a pump being part of the circulating system) complete thermo-siphon circulation may be secured while this heating unit is in operation by cutting out the interference which the pump would otherwise offer against such thermo-siphon circulation.

The heating unit can be located permanently either in a chamber which can be made a unit with the valve chamber in which the valve 8 is located, or else said heating unit can be applied, as shown at 25, in the by-pass 26 which affords a circuit around the circulating pump (when latter is a part of the circulating system). In this by-pass is located a valve 27, which may be of the butterfly type and which is so arranged that it is normally held in closed position, (by a spring, for instance) so that when the engine is running on the road, the pump will perform its usual function of circulating the water. The arrangement is such as will be more fully set forth hereinafter, that the electric connection, through wires reaching the unit in by-pass 26, can only be made when and after valve 27 is first opened, thus, as stated, allowing the heated water to go through by-pass 26 around the pump, and pass through the jackets of the engine block 2, past the controlled bulb at 4, through the line 3 to the radiator 1 and back through the line 6, past valve 8, back to by-pass 26, thus, as mentioned, giving complete thermo-siphon circulation and preventing any of the circulation system from being frozen up when the car is standing idle in the garage and when the heating unit is connected. By means of a switch 28 actuated by the lever 10 the controller will cut off the current when the temperature at 4 has reached the desired and predetermined point.

Figure 3:
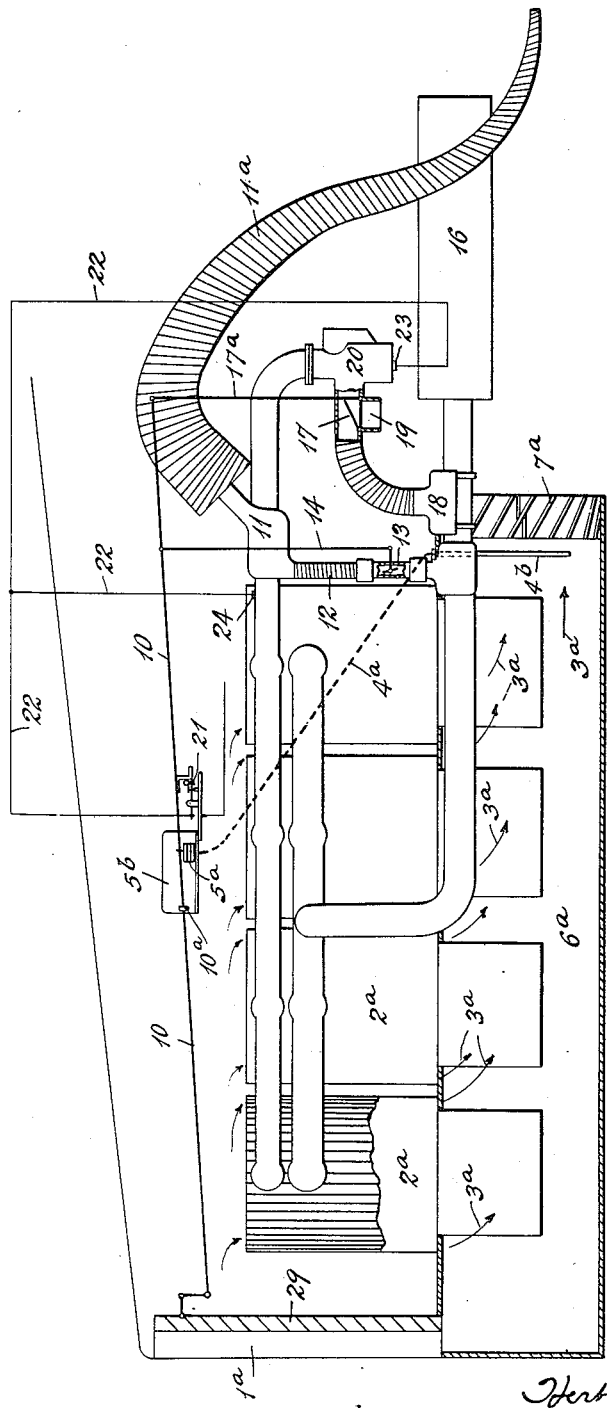

In Fig. 3 is shown schematically the adaptability of this invention to an air cooled motor, instead of a water cooled motor. In the case (for instance) of an air cooled automobile of the type in which the cylinders are provided with heat radiating fins which at their apices carry a jacket surrounding each cylinder and in which an air current is induced to flow through such jackets and past the radiating fins, the cooling air enters underneath the hood or bonnet at the grilled opening $1^a$, then flows through the jackets of the cylinders $2^a$, as shown by arrows $3^a$. All of these air currents meet at the point where the thermostatic bulb $4^b$ of the controller $5^b$ is located. The air circulation is occasioned because $6^a$ is a chamber which is closed on all sides except where the air is admitted at $3^a$ and then exhausted by the fan $7^a$. By locating the thermostatic bulb $4^b$ of the controller at the place indicated, ample space is secured for a bulb member that can be made very sensitive to temperature changes and which will reflect a temperature which is in exact relationship to the cylinder temperatures. If it is desired that an automatic control of a hot spot is particularly to be secured, the controller bulb could either be so located that it would reflect the temperature of the mixture or that it would reflect the temperature of the exhaust gas but neither location would be so desirable as locating the thermostatic bulb as shown at $4^b$. If the thermostatic bulb were located in the inlet manifold, it would be a disadvantage to provide enough space for the reception of a bulb large enough to secure extreme sensitiveness; furthermore, a bulb so located would be subject to liquid gasoline deposition on its surface which in evaporating would cause a depression of the bulb temperature, (giving the effect of a wet bulb thermometer) and, therefore, because of variable moisture deposition, cause erratic action of the controller. If the thermostatic bulb were located in any portion of the exhaust gas line the bulb would soon be insulated by carbon depositions on its surface and the difficulties of withstanding the higher temperatures of the exhaust gas would be involved.

The controller is shown in Fig. 3 as governing the temperature of the hot spot and as controlling an electric switch for supplying immediate heat for starting purposes and as governing the temperature of the air supply to the carburetor, all as also covered in the previous figures; an additional function is performed by the controller, as shown in this Fig. 3 however, by the automatic control, synchronously, of a shutter 29, arranged to regulate the volume of air available for direct cooling of the engine cylinders and thus enabling the cooling to be accomplished perfectly at all times, regardless of atmospheric temperatures, regardless of engine speed and, in connection with the synchronous, automatic control of the hot spot, with maximum economy of fuel and maximum efficiency of power output.

In Fig. 4 a different type of air cooled motor is schematically illustrated. In this case the cooling air is circulated past the cylinders by forced draft (instead of by induced draft as covered by Fig. 3) and this type of motor is shown to bring out another desirable location of the controller bulb. In applying the controller to the type of air cooled motor shown in Fig. 4, the controller bulb could of course be located in the heated air which absorbed heat from the cylinders but, of course, on account of a differently constructed motor, the thermostatic bulb would in such case be located above the cylinders and underneath the engine hood or bonnet. Instead of so locating the bulb I prefer to locate same in the oil circulating line as indicated, this being an ideal location because the temperature of the oil, occasioned by the engine which it lubricates, is in direct relationship with the cylinder temperatures and varies immediately with any change therein. Also oil has a much greater specific heat than air and, therefore is a much better medium in which to locate the thermostatic bulb of a controller.

In Fig. 5 I have shown an example of the controller hereinbefore mentioned, the illustration being in the nature of a diagram; and showing said controller reduced to its simplest form for the sake of clearness; it will be understood that the arrangement of the parts will in every instance be in accordance with the structure with which it is operatively combined and with the functions which said controller is to perform.

In the illustration 4 represents the thermostatic bulb of customary construction previously referred to and which is connected by means of the capillary tubing 4ª with an expansible and contractible member 5ª commonly known as a multiple bellows. In the preferred arrangement the bulb 4, capillary 4ª and bellows 5ª are filled with a fluid under pressure so that the bellows 5ª in its normal condition is partly expanded and when subjected to a normal atmospheric temperature are approximately of the form shown in Fig. 5. A lever 10 fulcrummed at 10ª is held in contact with the top of the bellows, preferably by a spring 30, and to said lever there are attached one or more connecting rods, similar to the connecting rods 9, 14, 17ª which, through proper linkage connections open and close the valve or valves and the electric switch or switches which may be part of the installations mentioned previously. In this description only the operation of the one valve shown is described as the operation of one or more valves or one or more switches in addition, either synchronously or progressively, is simply a matter of proper levers and links; for convenience of description the illustrated valve will be indicated as the valve 8 connected with the lever 10 by means of the connecting rod 9 and located in the pipe 6 forming part of the water circulation line. Adjustment of the lever 10 relatively to the bellows 5ª may be secured by a contact screw as shown at 31. Fig. 5 shows the relative positions of the various parts when the controller is so constructed, and so adjusted by means for the contact screw 31, that the valve 8 is closed when the water (for instance) affecting bulb 4 is cold. As the temperature at 4 rises, however, the expansion of the fluid within the bulb 4 causes the bellows at 5ª to expand, which raises the lever 10, the latter, in turn, causing the connecting rod to open the valve 8. If the temperature at 4 increases sufficiently the valve 8 will be wide open finally, as shown in Fig. 6. Assuming the controller to be applied to a water cooled automobile engine and arranged and set to bring the valve 8 wide open at 180° F., it is possible that the temperature at 4, nevertheless may go still higher which would cause the valve 8 to keep on moving and assume a position beyond its fully open position which would constrict the passage 6 unless provision were made to prevent this. Thus, as shown in Figs. 5, 6 and 7, the connecting rod 9 may be provided with a stop 32 co-operating with a suitable part of the controller to arrest the movement of said rod 9 and thus prevent further expansion of the bellows 5ª caused by the aforesaid higher temperature, from actuating the valve 8 beyond its wide open position. To prevent such further expansion of the bellows from injuring the controller the safety arrangement shown in Fig. 8 may be provided. As illustrated in this figure the rod 9 comprises two sections one of which terminates in a head 33 slidably located within a sleeve 34 which is connected with the other rod section 9ª as by screw-threading, a lock-nut 35 being provided for fixing the parts in their adjusted positions. A coil spring 36 is located within the sleeve 34 with its one end in engagement with the head 33 and its other end in contact with a cap 37 screwed or otherwise secured upon the sleeve 34. The spring 36 is normally under sufficient tension to prevent lost motion between the rod sections as the particular valve, switch or other element operated thereby is actuated. It will be obvious that any further expansion of the bellows 5ª after the stop 32 has arrested the movement of the rod 9 will simply cause the rod section 9ª to move relatively to the section 9 against the tension of the spring 36 which restores the parts to normal condition when the bellows 5ª contracts.

If, as in the case of the rods 14 and 17ª, the action thereof is a pushing force, the arrangement shown in Fig. 9 is substituted for that of Fig. 8, the only difference being that the spring 36 is located between the head 33 of the one rod section and an interior end wall of the sleeve 34. A continued expansion of the bellows 5ª beyond the point at which a movement of one rod section is arrested will slide or push the other rod section relatively thereto and compress the spring 36; otherwise this safety device may be the same as the one shown in Fig. 8.

As previously mentioned it is highly desirable to have the controller so arranged that leakage of the thermostatic fluid from either the bulb 4, capillary tube 4ª or bellows 5ª will have no effect to close the valve 8 or to actuate an equivalent element because of unintentional collapse of said bellows 5ª. If no provision were made to guard against the same, a rupture or leak anywhere in the bulb 4, capillary tube 4ª or bellows 5ª would cause a collapse of said bellows even if the water at 4 were hot and thus would permit the spring 30 to pull down the lever 10 and close valve 8 whereby the water circulation would be cut off from the motor with the result that the latter might be seriously injured before discovery of the trouble.

The means whereby this is prevented is shown in the illustrated example in the form of an auxiliary lever 38 pivoted at 39 and provided at one end with a stud 40 extending into and movable in a transverse slot 41 formed on the lever 10. The auxiliary lever 38 carries a contact screw 42 which passes through an opening in the lever 10 so as to clear the same and is held in contact with the bellows 5ª by means of a spring 43.

This lever does not operate the valve 8 or any other valve or any switches when there is pressure within the bellows 5ª, and the latter is either in a "cold" condition as shown by Fig. 5 or in a "hot" condition as shown by Fig. 6, because when bellows 5ª is cold, but nevertheless still contains fluid under pressure, the contact screw 42, which clears lever 10, and is held in contact by tension of spring 43, causes the operative end of lever 38 carrying the stud 40 to assume the position shown in Fig. 5. When bellows 5ª expands because of increased temperature at 4, the stud 40 is caused to move downward, but because of slot 41, in primary lever 10 in which the operative end of the lever 38 moves, the movement of stud 40 being relative to the lever 10 and thus has no influence on the valve 8 as shown by Fig. 6. However, when the bellows 5ª, as shown in Fig. 7, is in an entirely collapsed condition because a leakage or rupture has relieved the internal pressure which kept it in an expanded condition, when cold, as shown in Fig. 5 then the lever 38 becomes operative in connection with valve 8 as follows:

The tension of spring 43, which is made sufficient for the purpose, swings the auxiliary lever 38 on its pivot and thereby causes the stud 40 of said lever 38 to contact with the upper end of the slot 41 and swing the main lever 10 to the position shown in Fig. 7, whereby the valve 8 is maintained in a position of safety when there is an insufficiency of thermostatic fluid to make the controller unresponsive to heat.

In Fig. 10 I have shown in detail a form of switch 21 for making and breaking the electric contact in the arrangements illustrated in Figs. 1, 2, 3 and 4. The switch comprises a fixed base 44 on which a contact member 45 is mounted and provided with suitable binding posts 46 for connection by means of wires 47 with a source of electricity. A co-operating contact member 48 is carried by a lever 49 fulcrumed at 50 upon a lug 51 extending upwardly from the base 44, said lever 49 being further provided with an adjustable stop screw 52 co-operating with a fixed stop 53 upon the base 44 to arrest the rocking movement of the lever 49 in one direction. At the end opposite to that at which the contact member 48 is located the lever 49 is formed with a cam 54 which is acted upon by a roll 55 rotatably mounted upon a quick break or snap action plunger 56. The latter is mounted upon a bracket 57 so as to be slidable in the direction of its length and is maintained in and restored to its normal outer position by means of a spring 58, a collar 59 serving to arrest the outward movement of said plunger 56; the bracket 57 is secured at the proper point upon the primary lever 10 in any convenient manner.

With the arrangement in the position shown, the circuit is broken as would be the case if the controller bulb 4 had been subjected to sufficient heat to cause the lever 10 to swing the bracket 57 and plunger 56 with their co-operating parts upwardly. When said bulb 4 is cool enough and the lever 10 is swung in the reverse direction the roller 55 will ride along the one surface of the cam 54 and thus cause the plunger 56 to yield or move inwardly against the tension of the spring 58. As soon as the roller 55 has passed the apex of the cam 54 the spring 58 will quickly force the plunger 56 outwardly and by the action of said roller 55 upon said cam 54 will swing the lever 49 and thus bring the contact member 48 into engagement with the contact member 45 whereby the circuit is closed. As the bulb 4 heats up the bracket 57 will be swung upwardly again and the roller 55 by acting upon the cam 54 as described will return the parts to the positions shown in Fig. 10 in which the circuit is again open. The action of the switch is very rapid and quickly makes and breaks the contact in contradistinction to a "hanging" contact whereby undesirable arcing is caused.

In Figs. 11, 12, 13 and 14 I have shown in detail the electric heating attachment included in Fig. 2 and which comprises the heating unit 25 which may be of any conventional type and arranged to be energized by an electric current. In the illustrated example said heating unit is secured in position by being passed through suitable packing material 60 located between split rings 61 which are secured in place by means of a cap 62 arranged for screw-threaded connection with a boss 63 forming part of the by-pass 26 the whole comprising a stuffing box arrangement whereby a watertight connection with said heating unit 25 is provided. The latter at its outer end terminates in a plug 64 arranged to receive a co-operating plug 65 connected by means of suitable wires with a source of electrical energy. The valve 27 is connected by means of suitable links 66 with an arm 67 forming part of a member 68, the composite arm and member being pivoted at 69 and the latter at its free end being provided with a lateral extension or shield 70 arranged to cover and uncover the plug 64. A spring 71 serves to draw the parts to the position shown in Fig. 12 in which the valve 27 is closed while the plug 64 is covered by the extension 70; in this position of the parts it is impossible to connect the plug 65 with the plug 64.

When the car or other vehicle has been placed in a garage or other housing the member 68 is actuated to move the extension 70 aside and thus permit the connection of the plug 65 with the plug 64; as the member 68 is thus actuated the arm 67 will be coincidentally shifted and will, through the medium of the links 66, adjust the valve 27 to its open position as shown in Fig. 11. As soon as the plug 65 is withdrawn preparatory to starting the car or other vehicle the action of the spring 71 will immediately swing the extension 70 over the plug 65 and at the same time will close the valve 27 as shown in Fig. 12.

The operation of said valve 27 is therefore entirely automatic and in harmony with the connection and separation of the plugs 64 and 65; the valve 27 is thus closed when the car or other vehicle is in use and open only when the heating unit 25 is in operation and connected with a source of electricity.

My invention, which comprises a plurality of components each of which is adapted for use individually, or which may be joined in various combinations either wholly or in part to provide operative organizations is efficient and economical in operation and is entirely automatic and thus requires no continued supervision; said invention may be incorporated in existing outfits without difficulty.

Various changes in the specific forms shown and described may be made within the scope of the claims without departing from the spirit of my invention.

I claim:

1. The combination of an internal combustion engine having an intake manifold and an exhaust, a system for circulating a cooling medium whereby said engine is cooled, a valve in said system, a hot spot attached to said manifold and communicating with said exhaust, a valve in said exhaust connection, an automatic controller connected with both of said valves and a thermostatic bulb located in said circulating system whereby said controller is caused to actuate both of said valves in predetermined relation to regulate the supply of cooling medium to the engine and of the exhaust gases to the hot spot in accordance with the temperature of the cooling medium induced by the absorption of heat from the engine.

2. The combination of an internal combustion engine having an intake manifold and an exhaust, a system for circulating a cooling medium whereby said engine is cooled, a valve in said system, a hot spot attached to said manifold and communicating with said exhaust, a valve in said exhaust connection, a carburetor connected with said intake manifold, a stove externally connected with said exhaust, a connection from said stove to said carburetor, said connection having an air inlet, a valve controlling said connection and also controlling said air inlet, an automatic controller connected with all of said valves, and a thermostatic bulb located in a medium effected by heat generated by the engine in operation whereby said single controller is caused to actuate all of said valves in predetermined relation to regulate the supply of cooling medium to the engine, the volume of exhaust gases to the hot spot and the volume of heated air from the stove and incoming air through said air inlet to the carburetor in accordance with the temperature of said medium induced by the absorption of heat from the engine.

3. The combination of an internal combustion engine having an intake manifold and an exhaust, a system for circulating a cooling medium whereby said engine is cooled, a valve in said system, a hot spot attached to said manifold and communicating with said exhaust, a valve in said exhaust connection, a carburetor connected with said intake manifold, a stove externally connected with said exhaust, a connection from said stove to said carburetor, said connection having an air inlet, a valve controlling said connection and also controlling said air inlet, an electric heating device connected with said manifold, an electric circuit connecting said device with a source of electricity, a switch whereby said circuit is opened and closed, an automatic controller connected with all of said valves and with said switch and a thermostatic bulb located in said circulating system whereby said controller is caused to actuate all of said valves and said switch in predetermined relation to regulate the supply of cooling medium to the engine, the volume of exhaust gases to the hot spot, the volume of heated air from the stove and incoming air through said air inlet to the carburetor and the operation of said heating device in accordance with the temperature of the cooling medium induced by the absorption of heat from the engine.

4. The combination of an internal combustion engine having an intake manifold and an exhaust, a system for circulating a cooling medium whereby said engine is cooled, a valve in said system, a hot spot attached to said manifold and communicating with said exhaust, a valve in said exhaust connection, a carburetor connected with said intake manifold, a stove externally connected with said exhaust, a connection from said stove to said carburetor, said connection having an air inlet, a valve controlling said connection and also controlling said air inlet, an electric heating device connected with said manifold, an electric heating device connected with said carburetor, an electric circuit whereby said electric devices are both connected with a source of electricity, a switch whereby said circuit is opened and closed, a single automatic controller connected with all of said valves and with said switch and a thermostatic bulb located in said circulating system whereby said single controller is caused to actuate all of said valves and said switch in predetermined relation to regulate the supply of cooling medium to the engine, the volume exhaust gases to the hot spot, the volume heated air from the stove and incoming air through said air inlet to the carburetor and the operation of said heating devices in accordance with the temperature of the cooling medium induced by the absorption of heat from the engine.

5. The combination of an internal combustion engine, a system for circulating a cooling fluid whereby said engine is cooled when in operation, a control valve in said system, an automatic controller connected with said valve, a thermostatic bulb in said system whereby said controller is caused to actuate said control valve to regulate the supply of cooling fluid to the engine, a by-pass in said circulating system, an electrical heating unit in said by-pass for heating said fluid when said engine is not running, an electric circuit, including separable plugs whereby said unit is connected with a source of electricity, a switch in said circuit operated by said controller to control said heating unit in accordance with the temperature at said bulb, a valve in said by-pass for controlling the same, means connected with said valve and arranged to open and close the same automatically in harmony with the connection and separation of said plugs and a shield forming part of said means and arranged to normally prevent the connection of said plugs when said by-pass valve is closed, said shield being automatically adjusted to an inoperative position to permit the connection of said plugs when said by-pass valve is open.

In testimony whereof, I have hereunto set my hand.

HERBERT P. MILKER.